United States Patent [19]

Calcagni

[11] 4,383,812
[45] May 17, 1983

[54] EXTRUSION HEAD FOR MOLDINGS TO BE USED IN THE CONSTRUCTION OF WINDOW, DOOR AND THE LIKE FRAMES

[76] Inventor: Mario Calcagni, Via Roccolo 24, Morazzone, Italy

[21] Appl. No.: 166,226

[22] Filed: Jul. 7, 1980

[30] Foreign Application Priority Data

Nov. 30, 1979 [IT] Italy .............................. 27759 A/79

[51] Int. Cl.³ .............................................. B29F 3/04
[52] U.S. Cl. .............................. 425/133.1; 156/244.13; 156/500; 264/45.9; 264/173; 425/4 C; 425/463; 425/467
[58] Field of Search ................. 425/131.1, 133.1, 4 C, 425/463, 467; 156/244.13, 500; 264/171, 173, 45.9, 46.1

[56] References Cited

U.S. PATENT DOCUMENTS

| | | | |
|---|---|---|---|
| 3,189,941 | 6/1965 | Reifenhauser | 425/133.1 |
| 3,331,900 | 7/1967 | Thomas | 264/46.1 |
| 3,533,134 | 10/1970 | Blomqvist | 425/133.1 |
| 3,764,642 | 10/1973 | Boutillier | 425/4 C |
| 4,130,976 | 12/1978 | Kesseler et al. | 264/173 |

FOREIGN PATENT DOCUMENTS

| | | | |
|---|---|---|---|
| 2732866 | 1/1978 | Fed. Rep. of Germany | 264/45.9 |
| 2821333 | 11/1978 | Fed. Rep. of Germany | 264/45.9 |

Primary Examiner—Jeffery R. Thurlow
Attorney, Agent, or Firm—Guido Modiano; Albert Josif

[57] ABSTRACT

An extrusion head for moldings to be used in the construction of window, door and the like frames, as well as a molding produced thereby, are provided. A frequently encountered problem in the manufacture of plastics material moldings for window and door frames is represented by the necessity of increasing the mechanical strength and thermal insulation properties thereof, as well as the necessity of minimizing the amount of plastics material utilized. This technical problem is solved by providing an extrusion head affording the possibility of producing in one pass a molding having an outer skin of rigid PVC and an inner lining, adhering to said skin, made of rigid foamed PVC and defining an inner cavity. The extrusion head is provided, for this purpose, with a first mouth and a second mouth, having both a closed contour and being arranged one within the other, which are fed from two supply channels, independent of each other and so constructed as not to interfere with each other.

3 Claims, 4 Drawing Figures

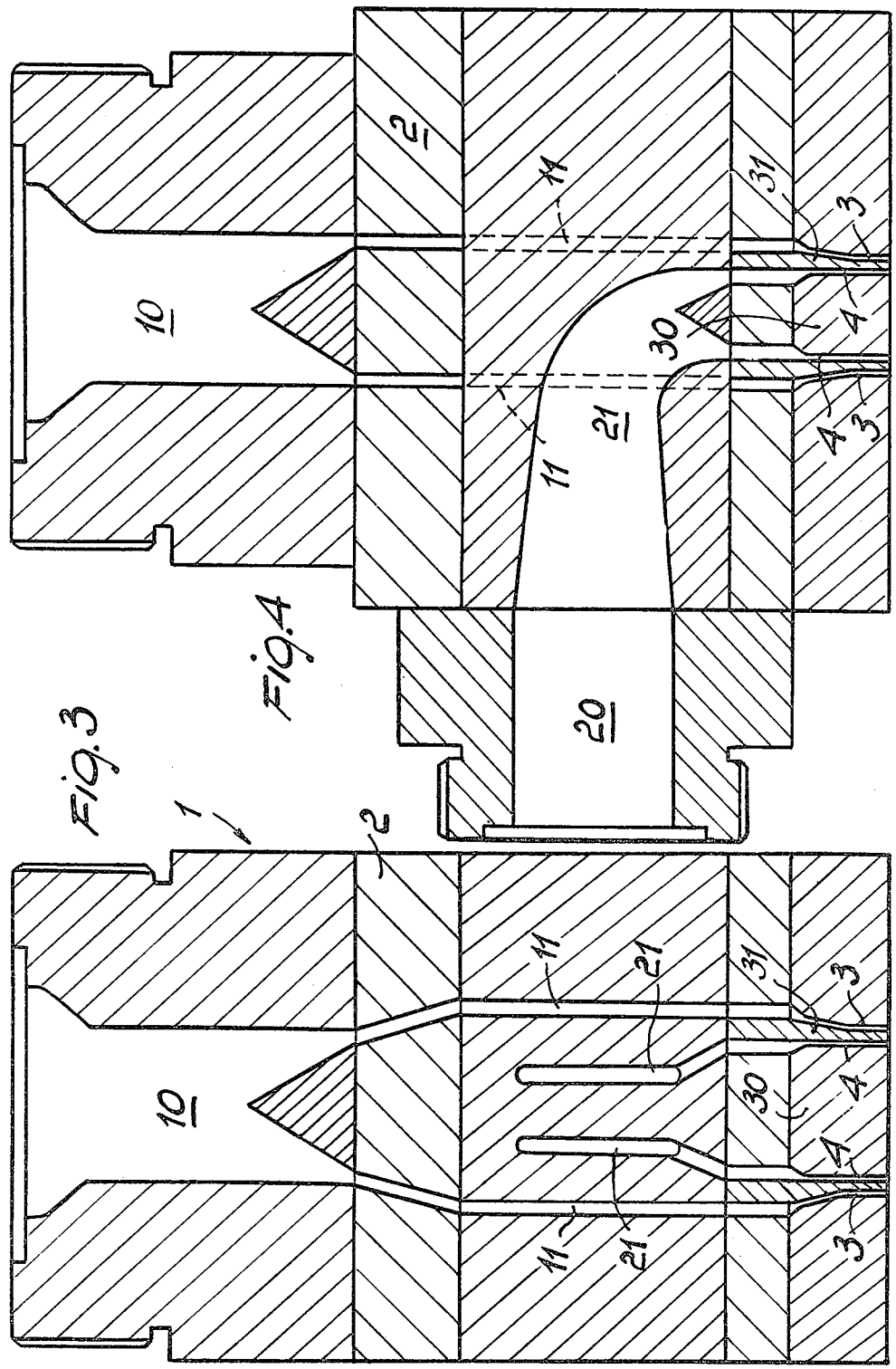

EXTRUSION HEAD FOR MOLDINGS TO BE USED IN THE CONSTRUCTION OF WINDOW, DOOR AND THE LIKE FRAMES

BACKGROUND OF THE INVENTION

This invention relates to an extrusion head for moldings to be used in the construction of window, door and the like frames, as well as to a molding produced thereby.

Currently known and marketed are moldings, or sectional members, for use in window, door and the like building frames, which are obtained by extruding a PVC blank.

To impart to the molding the required stiffness and mechanical strength, it is necessary to produce a molding which has comparatively high wall thickness dimensions, with the obvious consequence that a considerable amount of material must go in their construction.

In an attempt to solve the above problem, moldings for window and door frames have been introduced and are currently marketed which comprise a rigid outer PVC extrusion the hollow inside whereof is completely filled with a rigid PVC foam, which in addition to improving the mechanical strength of the molding, also serves the function of greatly improving the thermal insulation properties of the molding.

The latter solution, while improving the situation, has failed to prove consistently satisfactory because the amount of plastics material expended is considerably higher, and moreover, a serious problem is encountered during the extrusion process owing to the difficulty inherent to the extrusion of the molding inner core which, as mentioned, is of expanded or foamed PVC.

SUMMARY OF THE INVENTION

It is an object of this invention to eliminate such drawbacks of conventional extruders by providing an extrusion head which affords a molding having excellent mechanical strength, as well as high thermal insulation properties, accompanied by a considerable reduction in the amount of plastics material required for the manufacture of the molding.

A further object of the invention is to provide a molding or sectional member for the construction of window and door frames, which for a given amount of plastics material yields considerably improved mechanical strength and thermal insulation properties over similar conventional moldings, and which, by converse, affords a drastic reduction of the amount of plastics material expended for a given set of mechanical strength and thermal insulation properties.

Another object of this invention is to provide an extrusion head which, while being structurally simple, permits the co-extrusion of high-density rigid PVC and foamed rigid PVC in one pass.

A not unimportant object of the invention is to provide an extrusion head which can be easily formed from readily available elements and materials, requires no special maintenance, and is highly competitive from a purely economical standpoint.

These and other objects, such as will be apparent hereinafter, are achieved by an extrusion head for moldings to be used in the construction of window, door and the like frames, according to this invention, characterized in that it comprises a first closed contour extrusion mouth and a second closed contour extrusion mouth located internally to said first extrusion mouth and spaced apart therefrom, said first extrusion mouth being in communication with a first plastics material supply channel extending axially with respect to said first extrusion mouth and having at a middle region a pair of duct sections spaced apart from each other, said second extrusion mouth being in communication with a second plastics material supply channel extending substantially perpendicular to said first channel and divided into a pair of branching channels, spaced apart from each other and penetrating said middle region within the area enclosed between said duct sections without interfering with said duct sections.

BRIEF DESCRIPTION OF THE DRAWINGS

Further features and advantages will be more clearly understood from the description of a preferred but not limitative embodiment of an extrusion head for moldings to be used in the construction of window, door and the like frames, as well as of the molding produced thereby, with reference to the following exemplary drawings, where:

FIG. 3 is a sectional view of the extrusion head; and

FIG. 4 shows the extrusion head as sectioned along a plane perpendicular to the cross-section plane of FIG. 3.

DESCRIPTION OF THE PREFERRED EMBODIMENTS

Figure 1:
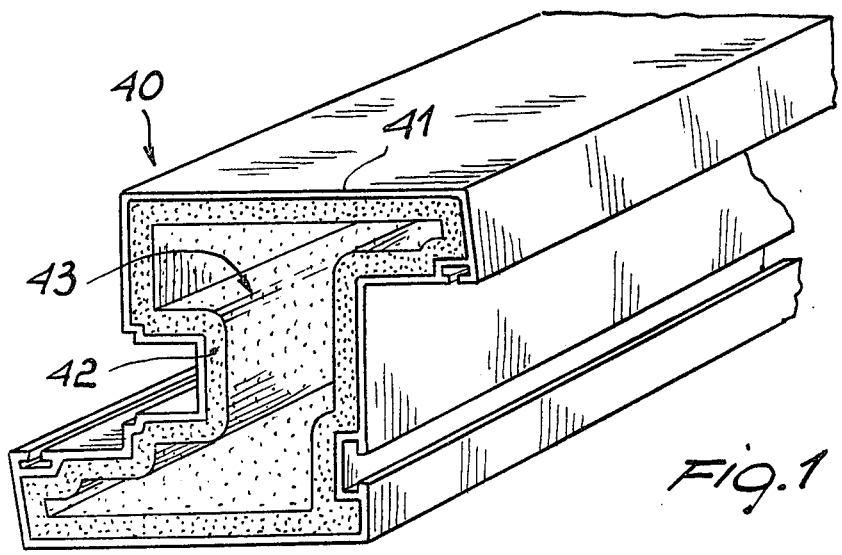
FIG. 1 shows schematically a perspective view of a molding form to be obtained with the extrusion head according to the invention.
Figure 2:
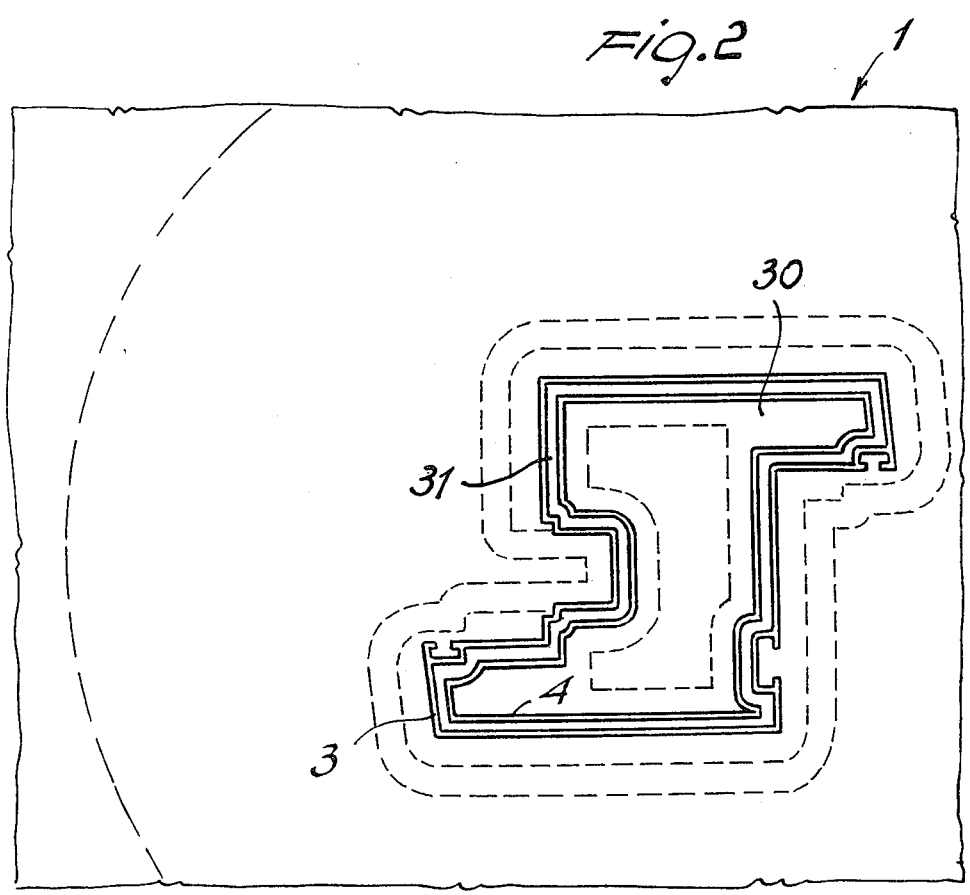
FIG. 2 illustrates the extrusion head to show the two extrusion mouths thereof.

With reference to the cited drawing figures, the extrusion head according to this invention, which is generally designated with the reference numeral 1, comprises a central body 2 wherein a first extrusion mouth 3 is formed which has a closed contour or outline and a second extrusion mouth 4 which is located internally to, and spaced apart from, the first mouth 3.

The first extrusion mouth 3 has the function of extruding, in a manner which will be more clearly set forth hereinafter, the high-density rigid PVC and has a configuration which corresponds in practice to the external shape of the molding to be produced. Obviously, this configuration will vary in accordance with the type and design of the molding to be extruded.

The second extrusion mouth 4 has a contour shape which is substantially similar to that of the first mouth 3, and has the function of forming a rigid PVC foam lining within the molding, whilst leaving a hollow or cavity inside the molding. The problem which this invention is directed to solve is that it is required that two different materials must be co-extruded which are to be fed simultaneously in manufacturing the molding. Furthermore, the second extrusion mouth must be designed and sized such that a rigid PVC foam lining can be formed inside the molding which has a thickness dimension appreciably constant throughout and which adheres securely to the outer skin of the high-density rigid PVC material mentioned above.

For this purpose, the extrusion head 1 is provided with a first supply canalization 10, 11 having an inlet length 10 for the extrusion of the high-density rigid PVC, said inlet length 10 being arranged to lay axially to the first mouth 3 and being divided, at a middle region thereof, into a pair of channel branches 11, spaced apart from each other and so arranged as to leave a clear area therebetween. As visible in particular from FIG. 3 a core forming an intermediate body portion divides the two channel branches from each other.

The practical realization of the supply channel does not differ in principle from the conventional configuration of a supply or feeding channel for an extrusion head, but has the distinctive feature of including at a middle region a pair of channel sections which are spaced apart from each other such as not to restrict the flow of plastics material being supplied.

The extrusion head according to the invention further comprises a second supply canalization 20, 21 which has an input length, indicated at 20, which extends substantially perpendicular to the first channel, in an arrangement that may be defined as right-angled.

Said second canalization 20, 21 wherethrough the rigid foamed PVC to be extruded is conveyed, branches out, at a middle portion thereof, into a pair of duct branches 21 spaced apart from each other, as shown more clearly in FIG. 3, which connect to the core forming the intermediate body portion of the extrusion head 2, where the first canalization 10, 11 presents the two spaced-apart channel branches 11; thus, it becomes possible to put into communication the second canalization 20, 21 with the second extrusion mouth 4 arranged inside the mouth 3, without interference between the first and second supply canalizations.

Advantageously, and as shown best in FIG. 3, the cited duct branches have an elongated cross-sectional configuration, thereby they do not restrict the flow section and converge to the region included between the channel sections.

Downstream of said middle region of the extrusion head, both said channel branches 11 and said duct branches 21 widen out to practically merge together, that is the two branches converge into a common extrusion area, similarly for the two canalizations, thus forming the closed contour of the respective extrusion mouths.

To achieve the cited type of extrusion within the mouth 4, there is provided a core 30 which has the function of forming the cavity within the molding being extruded, and an annular core 31 is provided between the first and second extrusion mouth 3, 4.

During the extrusion process, it happens that, owing to the extreme compatibility of the two materials employed, i.e. high-density rigid PVC and foamed rigid PVC, upon completion of the extrusion step proper, during its expansion phase, the foamed rigid PVC carefully adheres to the high-density rigid PVC constituting the outer skin, thus forming an integral structure possessed of high mechanical strength and thermal insulation properties.

More specifically, the molding 40 thus obtained has an outer portion or skin 41 of rigid extruded PVC which has the desired shape for the final molding, inside which skin a lining 42 is formed, to a thickness of a few millimeters, which lines the inside surface of the skin 41 to define a cavity 43 therein which remains unoccupied by the material.

Thus, the resulting molding is remarkably light in weight, which means a reduced amount of material expended in its production as well as a considerable mechanical strength, as a result of the combination of high-density rigid PVC and foamed rigid PVC, which mechanical strength is much higher than that of similar conventional moldings. Moreover, the foamed rigid PVC lining imparts high thermal insulation properties which are of particular value for the purpose of energy control.

It will be appreciated from the foregoing that the invention achieves its objects, and the fact is emphasized in particular that this extrusion head is extremely simple in design and construction, while it affords, with quickly carried out design arrangements, the accomplishment of co-extrusion in a single pass of the molding of this invention.

The invention as described is susceptible to many modifications and variations, all of which fall within the purview of the instant inventive concept.

Furthermore, all of the details may be replaced with other technically equivalent elements.

In practicing the invention, the materials employed—although the best results have been obtained with the materials specified hereinabove—and the dimensions and contingent shapes may be any ones to suit individual applicational requirements.

I claim:

1. An extrusion head for moldings to be used in the construction of windows, door and like frames, comprising: a first closed contour extrusion mouth defining an axis of the extrusion head, a second closed contour extrusion mouth coaxial therewith and located internally to said first closed contour extrusion mouth, a first plastic material supply canalization in communication with and extending coaxially with respect to said first extrusion mouth, said first canalization having an inlet length, an intermediate length coaxial therewith and comprising two spaced apart channel branches arranged side by side with respect to each other and opening with one end thereof into said inlet length and opening with the other end thereof into said first extrusion mouth, a core portion between said two channel branches separating laterally said channel branches from each other to leave free an intermediate body portion thereof therebetween, a second plastics material supply canalization in communication with said second extrusion mouth and having an input length substantially perpendicular to said first plastics material supply canalization and extending in a median plane thereof substantially parallel to said axis, an intermediate extension of said second canalization extending in a plane parallel with said median plane and comprising two spaced apart duct branches of substantially elongated configuration in cross-section arranged side by side with respect to each other and opening with one extremity thereof into said input length and opening with the other extremity thereof into said second extrusion mouth, said two spaced apart duct branches extending through said intermediate body portion at a distance from said two spaced apart channel branches of the first canalization to avoid thereby interference therewith, said two spaced apart duct branches having an elbow like bend in an intermediate zone thereof within said intermediate body portion thereby to direct said other extremity thereof coaxial with said second extrusion mouth.

2. An extrusion head according to claim 1, wherein downstream of said intermediate body portion said duct branches widen out to merge together and define a closed contour supply channel, and said channel branches widen out to merge together and define a second closed contour supply channel located internally to said first closed contour supply channel.

3. An extrusion head according to claim 1, wherein inside said second extrusion mouth there is defined an extrusion core connected to an area enclosed between said branching channels and adapted for forming a cavity within the molding to be extruded, there being further provided an annular inner core interposed between said first and second extrusion mouths and connected to said area enclosed between said duct sections but external to said branching channels.

* * * * *